No. 676,817. Patented June 18, 1901.
J. F. HALL.
STOP MOTION.
(Application filed Feb. 23, 1901.)
(No Model.)
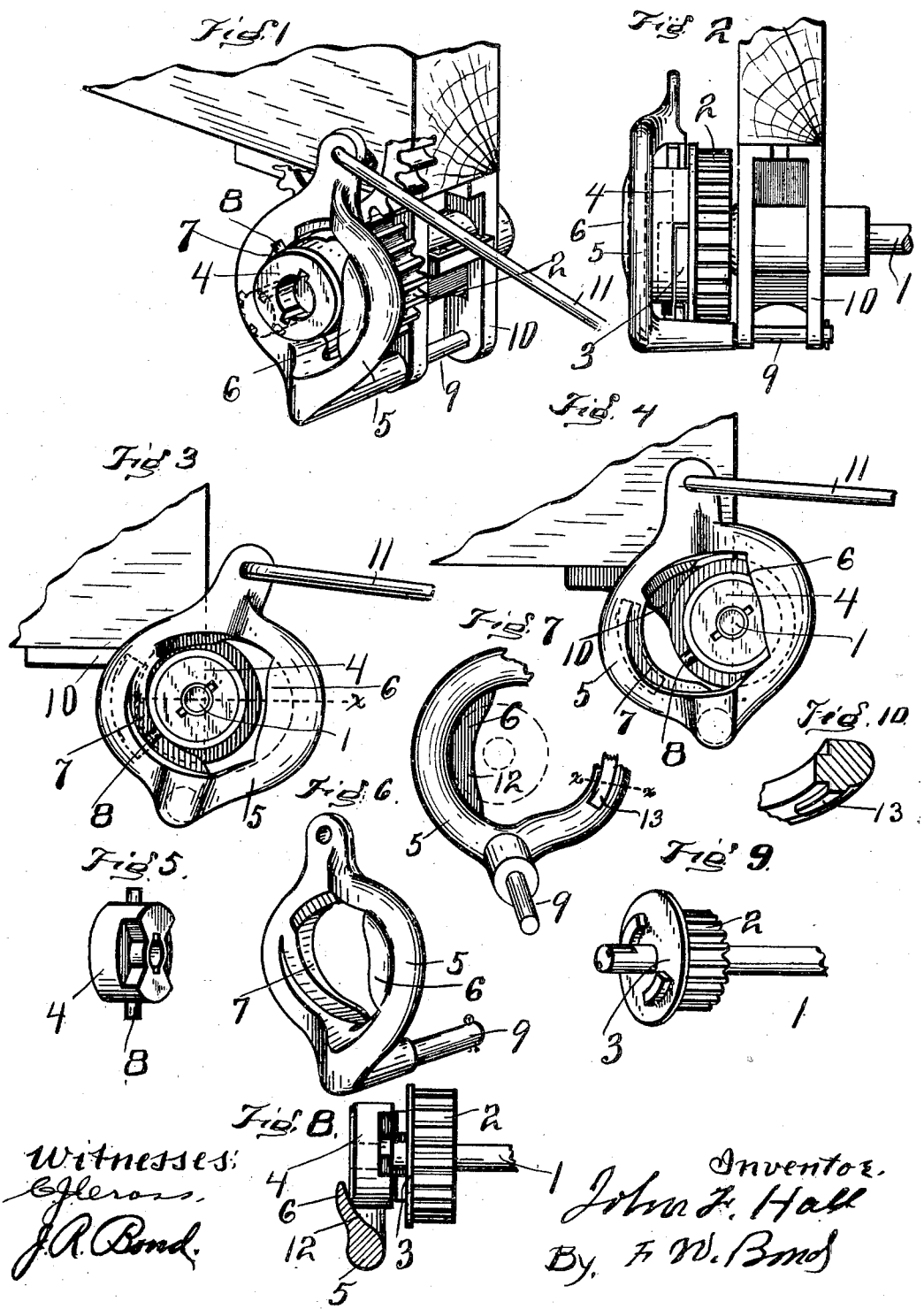

UNITED STATES PATENT OFFICE.

JOHN F. HALL, OF MASSILLON, OHIO.

STOP-MOTION.

SPECIFICATION forming part of Letters Patent No. 676,817, dated June 18, 1901.

Application filed February 23, 1901. Serial No. 48,490. (No model.)

*To all whom it may concern:*

Be it known that I, JOHN F. HALL, a citizen of the United States, residing at Massillon, in the county of Stark and State of Ohio, have invented certain new and useful Improvements in Stop-Motions; and I do hereby declare that the following is a full, clear, and exact description of the same, reference being had to the annexed drawings, making a part of this specification, and to the figures of reference marked thereon, in which—

Figure 1 is a perspective view. Fig. 2 is a side elevation. Fig. 3 is an end view. Fig. 4 is an end view showing the oscillating cam in the opposite direction from that illustrated in Fig. 3. Fig. 5 is a detached view of the sliding clutch member. Fig. 6 is a detached view of the oscillating cam. Fig. 7 is a detached view showing a portion of the oscillating cam and the sliding clutch member in dotted lines. Fig. 8 is a view showing the two clutch members and illustrating a portion of the oscillating cam, showing said cam in section. Fig. 9 is a detached view of the fixed clutch member and pinion properly mounted upon a shaft. Fig. 10 is a view showing a portion of the oscillating cam and its lateral flange.

The present invention has relation to stop-motions especially designed for clutches; and it consists in the different parts and combination of parts hereinafter described, and particularly pointed out in the claims.

The object of the present invention is to provide a means for quickly and easily stopping the motion of machinery in case of accident or for any other purpose.

Similar numerals of reference indicate corresponding parts in all the figures of the drawings.

In the accompanying drawings, 1 represents the power-shaft or a subdriving shaft, as the case may be, which is properly journaled and upon which is loosely mounted a pinion or belt wheel, as the case may be, such as 2.

It will be understood that it is immaterial as to the kind of gearing employed; but to illustrate my invention I have used cog-gearing.

Upon the face of the pinion or wheel 2 is located the clutch member 3. Upon the shaft 1 is slidably mounted the clutch member 4, which clutch member revolves with the shaft 1 and imparts rotary motion to the pinion 2 when the clutch member 4 is engaged with the clutch member 3; but when the sliding clutch member 4 is disengaged from the clutch member 3 said clutch member, together with the pinion 2, remains at rest.

When it is desired to have the pinion 2 rotate with the shaft 1, and thereby impart motion to the machinery driven by the pinion 2, the clutch members 3 and 4 are interlocked, as illustrated in Fig. 2, at which time the oscillating cam 5 is in the position illustrated in Fig. 4, which position brings the inclined lip or flange 6 over a portion of the outer face of the sliding clutch member 4, and thereby holds the clutch member 4 in operative position with the clutch member 3.

When it is desired to stop the machinery propelled by the pinion 2 or its equivalent, the oscillating cam 5 is turned or brought into the position illustrated in Figs. 1 and 3, the movement of which brings the lip 6 away from the outer face of the sliding clutch member 4 and brings the incline or cam 7 adjacent to the periphery of the sliding clutch 4.

The sliding clutch 4 is provided with the pin 8, which pin is so located that as the sliding clutch 4 revolves it will come in contact with the incline or cam 7, thereby moving or sliding the clutch member 4 upon the shaft 1 until the clutch members 4 and 3 are disengaged from each other, at which time the clutch member 3 ceases to rotate.

It will be understood that the oscillating cam 5 can be quickly and easily brought into position to disengage the clutch members or to engage them, as desired, inasmuch as said oscillating cam is held in proper position by means of the pin 9, which pin is journaled to the frame 10 or its equivalent.

For the purpose of moving the oscillating cam, a rod or cord, such as 11, is provided and is attached to the upper free end of the oscillating cam and may be extended to any desired point.

It will be understood that any desired number of cords or rods may be connected or brought into operative position with the oscillating cam, so as to provide for the stopping of machinery at any desired number of points or places, thereby allowing apertures in case of accident to stop the machinery by the simple oscillation or rocking of the cam 5.

The periphery of the clutch member 4 is beveled upon its outer end and is so beveled for the purpose of allowing the inclined face 12 of the lip 6 to pass by said sliding clutch member, so as to move said sliding clutch member into engagement with clutch member 3.

It will be understood that the shaft 1 may be extended and a stop located thereon to limit the outward movement of the sliding clutch member 4; but this is not illustrated except in dotted lines, Fig. 1.

For the purpose of preventing the oscillating cam from coming in contact with the sliding clutch member 4 said oscillating cam is provided with the flange 13, which flange is so located that it will ride upon the periphery of the flange portion of the clutch member 3.

For the purpose of preventing the oscillating cam from binding or tilting during the time the pin or stud 8 is going up the incline, the back part of the oscillating cam rests against the face of the clutch member 3, beyond the clutch-sections of said clutch member or flanged portion of the clutch member.

As to the operation of the sliding clutch and pinion 2, the description applies when power is applied to the shaft 1. If, however, the driving power is applied to the pinion 2 instead of the shaft 1, then of course the pinion would revolve upon the shaft 1 and the sliding clutch member and shaft remain at rest; but the operation of my device is the same regardless of the source of power. It will be understood that the sliding clutch member 4 may be provided with two pins, such as 8, or one, as desired, and that said pins may be formed integral with said sliding member, or they may be separately made and attached in any convenient and well-known manner.

Having fully described my invention, what I claim as new, and desire to secure by Letters Patent, is—

1. The combination of a shaft having loosely mounted thereon a propelling-wheel and a clutch member, a sliding clutch member located upon the shaft having the power-wheel and an oscillating cam provided with an inclined lip, said inclined lip located upon the opposite side from that of the cam, and a pin located upon the periphery of the sliding clutch member, substantially as and for the purpose specified.

2. In a stop-motion a shaft, two interlocking clutch members, one of said clutch members slidably mounted upon the shaft, and the other loosely mounted thereon, the slidable member rotatable with the shaft, an oscillating cam adapted to slide the clutch into engagement with the non-slidable one and out of engagement therewith by the oscillation of the oscillating cam, substantially as and for the purpose specified.

3. The combination of two clutch members one of said members slidably mounted upon a shaft and rotatable with the shaft upon which it is mounted, said slidable clutch member provided with a beveled face, an oscillating cam provided with a lip having an inner inclined edge, and an inclined way located opposite the lip having the inclined face, substantially as and for the purpose specified.

4. The combination of a shaft having loosely mounted thereon a pinion, a sliding clutch member provided with a projection upon its periphery, an oscillating cam provided with an incline and a flange located upon the opposite side from that of the incline, and a clutch member having a disk, substantially as and for the purpose specified.

In testimony that I claim the above I have hereunto subscribed my name in the presence of two witnesses.

JOHN F. HALL.

Witnesses:
J. A. JEFFERS,
F. W. BOND.